(12) United States Patent
Tsitkin et al.

(10) Patent No.: US 11,356,469 B2
(45) Date of Patent: *Jun. 7, 2022

(54) METHOD AND APPARATUS FOR ESTIMATING MONETARY IMPACT OF CYBER ATTACKS

(71) Applicant: Barracuda Networks, Inc., Campbell, CA (US)

(72) Inventors: Alexey Tsitkin, Santa Clara, CA (US); Marco Schweighauser, Cupertino, CA (US); Nadia Korshun, Cupertino, CA (US); Shachar Sapir, Redwood City, CA (US); Fleming Shi, Scotts Valley, CA (US)

(73) Assignee: Barracuda Networks, Inc., Campbell, CA (US)

( * ) Notice: Subject to any disclaimer, the term of this patent is extended or adjusted under 35 U.S.C. 154(b) by 163 days.

This patent is subject to a terminal disclaimer.

(21) Appl. No.: 16/899,570

(22) Filed: Jun. 11, 2020

(65) Prior Publication Data

US 2020/0314137 A1    Oct. 1, 2020

Related U.S. Application Data

(63) Continuation-in-part of application No. 15/920,855, filed on Mar. 14, 2018, now Pat. No. 10,778,814.

(60) Provisional application No. 62/941,219, filed on Nov. 27, 2019, provisional application No. 62/537,382, filed on Jul. 26, 2017.

(51) Int. Cl.
*H04L 9/40* (2022.01)

(52) U.S. Cl.
CPC ...... *H04L 63/1433* (2013.01); *H04L 63/1416* (2013.01); *H04L 63/1425* (2013.01); *H04L 63/1441* (2013.01)

(58) Field of Classification Search
CPC ............ H04L 63/1433; H04L 63/1416; H04L 63/1425; H04L 63/1441
See application file for complete search history.

(56) References Cited

U.S. PATENT DOCUMENTS

| | | | |
|---|---|---|---|
| 7,904,913 B2* | 3/2011 | Sim-Tang | G06F 11/1448 719/318 |
| 8,544,023 B2* | 9/2013 | Sim-Tang | G06F 16/1873 719/311 |
| 9,661,003 B2* | 5/2017 | Parker | H04L 63/1408 |
| 9,680,855 B2* | 6/2017 | Schultz | G06Q 10/0635 |

(Continued)

*Primary Examiner* — J. Brant Murphy (57) ABSTRACT

A new approach is proposed to support generating and presenting to a user cyber attack monetary impact estimation of a current or future cyber attack, which is used to stop monetary losses or to mitigate monetary impacts. First, both historic data and real time data on monetary impact of current and/or potential cyber attacks is continuously collected from a plurality of data pools. The collected data is then synchronized, correlated and filtered/cleansed once the data is available to create fidelity among the data from the plurality of data pools. The cyber attack monetary impact is calculated based on the correlated and cleansed data, and is presented to the user along with one or more suggested applications by the user in response to the cyber attack monetary impact, to mitigate the monetary impact of the current or future cyber attack.

20 Claims, 7 Drawing Sheets

(56) References Cited

U.S. PATENT DOCUMENTS

| | | | |
|---|---|---|---|
| 9,712,547 B2* | 7/2017 | Touboul | G06F 21/56 |
| 10,348,757 B2* | 7/2019 | Renouil | G06Q 40/08 |
| 10,581,874 B1* | 3/2020 | Khalid | G06F 21/562 |
| 2006/0101384 A1* | 5/2006 | Sim-Tang | G06F 11/1448 |
| | | | 717/104 |
| 2006/0253709 A1* | 11/2006 | Cheng | H04L 63/105 |
| | | | 713/182 |
| 2011/0252432 A1* | 10/2011 | Sim-Tang | G06F 16/168 |
| | | | 719/318 |
| 2013/0031625 A1* | 1/2013 | Lim | G06F 21/552 |
| | | | 726/22 |
| 2014/0380488 A1* | 12/2014 | Datta Ray | H04L 63/1433 |
| | | | 726/25 |
| 2015/0381649 A1* | 12/2015 | Schultz | H04L 63/1433 |
| | | | 726/25 |
| 2016/0028758 A1* | 1/2016 | Ellis | H04L 63/1433 |
| | | | 726/25 |
| 2016/0248800 A1* | 8/2016 | Ng | G06Q 10/0635 |
| 2017/0013011 A1* | 1/2017 | Renouil | G06Q 20/4016 |
| 2017/0187745 A1* | 6/2017 | Ng | H04L 63/20 |
| 2017/0346846 A1* | 11/2017 | Findlay | H04L 63/20 |
| 2017/0366572 A1* | 12/2017 | King-Wilson | H04L 63/1433 |
| 2018/0191765 A1* | 7/2018 | Cho | H04L 63/1433 |
| 2019/0327259 A1* | 10/2019 | DeFelice | H04L 63/1408 |

* cited by examiner

Collect timely and continuously data on risks of current and/or potential cyber attacks from a plurality of data pools over networks, systems, and/or products for real time cyber attack risk analysis, wherein data being collected from at least one of the data pools is actual data to be processed for cyber attack risk analysis and data being collected from at least one of the data pools is influential data on the actual data being collected
202

Synchronize and correlate the data collected from the data pools once the data is readily available to ensure that there is fidelity among the data from the various data pools
204

Calculate a single composite cyber security threat index (CSTI) based on the correlated and cleansed actual data on cyber attack risks and its corresponding influential data, wherein the CSTI not only provides a user with an indication of the current risk of a cyber attack but also predicts an elevated level of risk of a future cyber attack
206

Present the CSTI to the user along with one or more suggested applications by the user in response to the CSTI to block the current cyber attack and/or to prevent the future cyber attack
208

Scan Description

The file was scanned by the Barracuda Advanced Threat Detection (ATD) service. ATD scans for malware, zero-day exploits, and targeted attacks not detected by other virus scanning features or the intrusion prevention system. ATD analyzes files in a secure cloud environment and makes an overall determination once scanning is complete.

Overall Determination

Verdict                MALICIOUS

File Metadata

| | |
|---|---|
| Extension | rtf |
| Mime Type | application/rtf |
| Size | 6,713 bytes |
| SHA-256 | (hash) |
| SHA-1 | (hash) |
| MD5 | (hash) |

Threat Analysis

Behavioral Heuristics

| | |
|---|---|
| Determination | MALICIOUS |
| Details | EXP/CVE-2017-0199.jmrw ; exploit ; Contains detection pattern of the exploits EXP/CVE-2017-0199.jmrw |

Collect continuously data on monetary impact of current and/or potential cyber attacks from a plurality of data pools over computer networks, computer systems, and/or products, wherein both historic data and real time data are being collected, wherein data being collected from at least one of the data pools is monetary data, wherein data being collected from at least one of the data pools is cyber attack risk data
502

Synchronize and correlate the data being collected from the data pools once the data is available, wherein the synchronization and correlation of the collected data from the data pools creates fidelity among the data from the plurality of data pools, and further cleanse the collected data after the synchronization and correlation of the collected data
504

Calculate the cyber attack monetary impact based on the correlated and cleansed data, wherein the calculation is based on both the monetary data and the cyber attack risk data, wherein the cyber attack monetary impact provides a user with an indication of the monetary impact of a current or future cyber attack
506

Present the cyber attack monetary impact to the user along with one or more suggested applications by the user in response to the cyber attack monetary impact, to mitigate the monetary impact of the current or future cyber attack
508

FIG. 5

METHOD AND APPARATUS FOR ESTIMATING MONETARY IMPACT OF CYBER ATTACKS

CROSS-REFERENCE TO RELATED APPLICATIONS

This application claims the benefit of U.S. Provisional Patent Application No. 62/941,219, filed Nov. 27, 2019, and entitled "METHOD AND APPARATUS FOR ESTIMATING MONETARY IMPACT OF CYBER ATTACKS;", which is incorporated herein in its entirety by reference.

This application is also a continuation-in-part application of U.S. patent application Ser. No. 15/920,855, filed Mar. 14, 2018, and entitled "METHOD AND APPARATUS FOR CYBER SECURITY THREAT INDEX", which in turn claims the benefit of U.S. Provisional Patent Application No. 62/537,382, filed Jul. 26, 2017, also entitled "METHOD AND APPARATUS FOR CYBER SECURITY THREAT INDEX;" both of which are incorporated herein in their entirety by reference.

BACKGROUND

The formation of Internet led to massive amount of adoption in how people/users interact with computer systems in the 1990's and early 2000's. Moreover, the user interfaces people lived by helped them to utilize computer systems and networks as new tools to enhance their capabilities in solving issues for the real world. However, the user interfaces were limited at the time, which led to development of more ways to interact with the computer systems and the networks. In many forms of consumption, information is delivered to, consumed/digested by the users who eventually get the systems to perform many tasks such as online shopping and banking, etc. As people continue to build connections among the computer systems, they also start to share digital content which include but is not limited to documents, voices, images, videos, phrases, gestures and many other forms of communications among the systems. The rapid increases in sharing of such digital content has led to the explosion of social media where people have developed another dimension of themselves and their relationships with others. Before social media, people connected with each other via face-to-face meetings, phone calls, newspapers and radio/television broadcasts. But now one can interact with others almost instantaneously via digital content/electronic messages in the forms that include but are not limited to emails, instant messages, short messages, text messages, social media posts, and even video phone calls. When the exposure is so large in the digital world with so many forms of media, people are naturally and inevitably introducing more security risks in the cyber world/cloud/Internet into the computer systems and networks they use and interact with than they had before. Unlike their physical biological forms in which people may sense danger, triage and remediate, people lack sensors, urgency and risk assessment capabilities in the digital world, which leads to computer systems ill-prepared for the risks of cyber attacks.

Currently, companies increasingly lose money through blackmailing, phishing, and other cyber-attacks. Attackers try to extort or deceive employees in order to get a monetary payout from the companies. Those payout amounts are substantial and can occur frequently if employees are not trained properly or with no implementation of protection solutions. Despite best intentions by the companies, attacks still slip through all protection layers. If that happens, the companies either pay with their own money or have cyber insurance in place.

In order to properly assess the risk of cyber attacks and to optimize transactional cost such as cyber insurance premiums, a better way to calculate the monetary impact of the cyber attacks is needed. Currently all offerings (e.g., NormShield, Security Scorecard) for risk assessments try to scan for potential security issues. This can include scanning for one or more of known Common Vulnerabilities and Exposures (CVE) SQL-injection on websites, disabled multi-factor-authentication (MFA) and other (mostly) exterior available information. There are three big issues with those solutions:

The potential monetary impact of a cyber attack and frequency of those cyber attacks cannot be estimated.

Certain potential security holes (e.g., an open server, missing password) may never lead to monetary or customer data loss in the first place.

The collected data on the cyber attacks is mostly static. It is not known if there were previous successful cyber attacks and how many cyber attacks may happen in the future nor how frequently they may occur.

The foregoing examples of the related art and limitations related therewith are intended to be illustrative and not exclusive. Other limitations of the related art will become apparent upon a reading of the specification and a study of the drawings.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

FIG. 3C depicts an example of a screenshot of an analysis of what the RTF file type tries to do when an attachment to the NotPetya-type ransomware was downloaded in accordance with some embodiments.

DETAILED DESCRIPTION OF EMBODIMENTS

The following disclosure provides many different embodiments, or examples, for implementing different features of the subject matter. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed.

A new approach is proposed that contemplates systems and methods to support generating and presenting a single composite Cyber Security Threat Index (CSTI) to a user, wherein the CSTI provides the user with an indication of the risk of cyber attacks globally and/or in the context of his/her current networking environment. First, various sources/pools of data are collected from operational networks, systems, and/or products for index calculation, wherein such operational data includes but is not limited to files that are being weaponized in the cyber attacks against computer systems and networks, the surfaces and contexts on which the cyber attacks are launched, and influential factors on these data. The data collected from various pools is then synchronized, correlated, and filtered/cleansed so that it can be used to assess the risk of the cyber attacks. The CSTI is then calculated based on the correlated data on cyber attacks and interactively presented to the user, who may then take corresponding remediation actions to prevent a cyber attack from happening or spreading.

Under the proposed approach, the CSTI not only provides the user with an indication of the current risk of a cyber attack, it may also predict or forecast an elevated level of threat of a cyber attack that may happen in the future, and thus enabling the user to take cautionary measures accordingly before the cyber attack actually happens. Additionally, the CSTI is not limited to a global form that reflects the global risk of cyber attacks, it can also be in a customized/personalized form in the context of the current computing and network environment of the user to reflect the risk of cyber attacks that may specifically target the user.

As used hereinafter, the term "user" (or "users") refers not only to a person or human being, but also to an organization, a group of organizations, a country, and even a continent that may be subject to a cyber attack.

Figure 1:
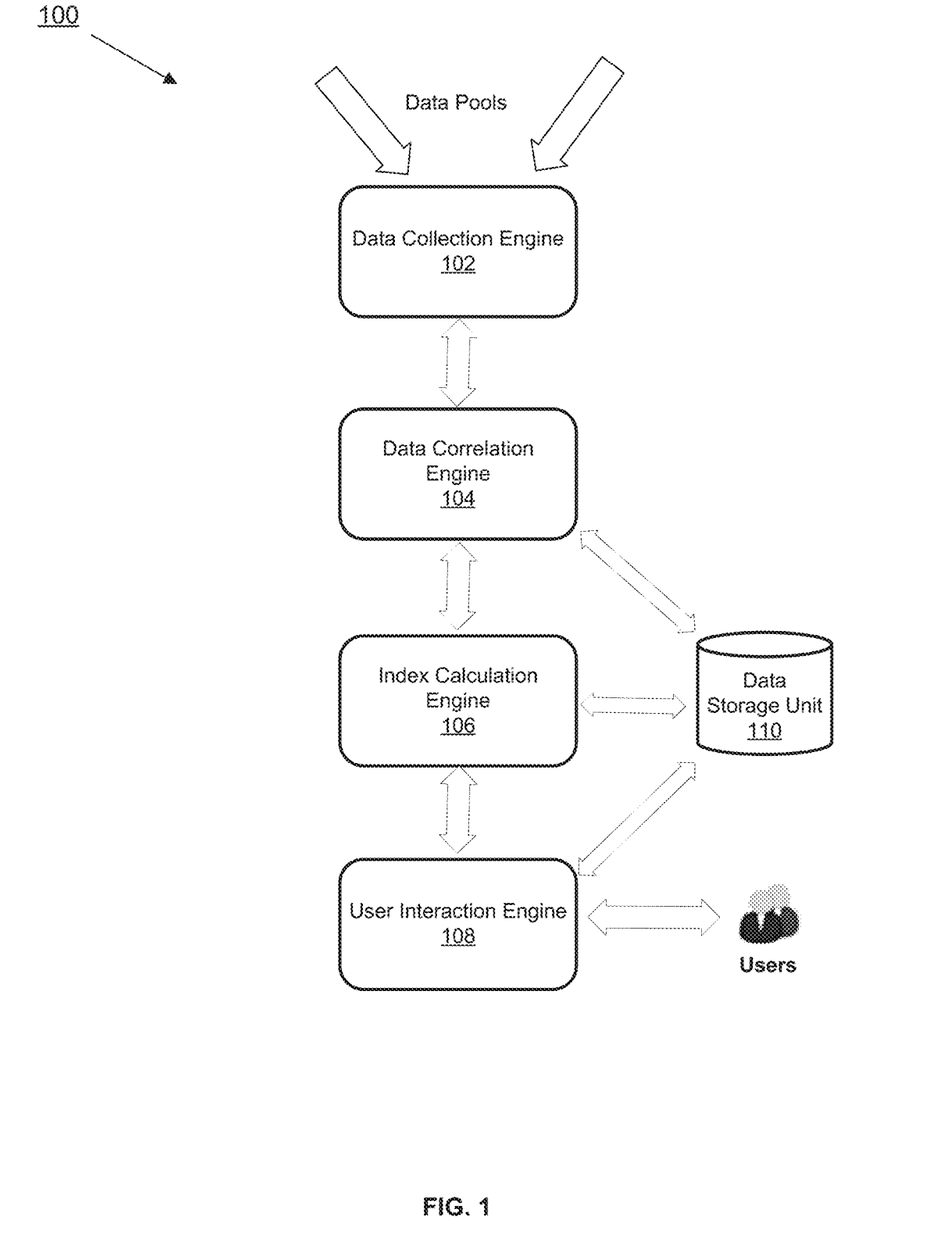
FIG. 1 depicts an example of a system diagram to support generating a single composite Cyber Security Threat Index (CSTI) in accordance with some embodiments.

FIG. 1 depicts an example of a system diagram 100 to support generating a single composite Cyber Security Threat Index (CSTI). Although the diagrams depict components as functionally separate, such depiction is merely for illustrative purposes. It will be apparent that the components portrayed in this figure can be arbitrarily combined or divided into separate software, firmware and/or hardware components. Furthermore, it will also be apparent that such components, regardless of how they are combined or divided, can execute on the same host or multiple hosts, and wherein the multiple hosts can be connected by one or more networks.

In the example of FIG. 1, the system 100 includes at least a data collection engine 102, a data correlation engine 104, an index calculation engine 106, a user interaction engine 108, and a data storage unit 110. These engines and units runs on one or more computing units/appliances/hosts (not shown) each with software instructions stored in a storage unit such as a non-volatile memory (also referred to as secondary memory) of the computing unit for practicing one or more processes. When the software instructions are executed, at least a subset of the software instructions is loaded into memory (also referred to as primary memory) by one of the computing units of the host, which becomes a special purposed one for practicing the processes. The processes may also be at least partially embodied in the host into which computer program code is loaded and/or executed, such that, the host becomes a special purpose computing unit for practicing the processes. When implemented on a general-purpose computing unit, the computer program code segments configure the computing unit to create specific logic circuits.

In the example of FIG. 1, each host can be a computing device, a communication device, a storage device, or any computing device capable of running a software component. For non-limiting examples, a computing device can be but is not limited to a server machine, a laptop PC, a desktop PC, a tablet, a Google's Android device, an iPhone, an iPad, and a voice-controlled speaker or controller. Each host has a communication interface (not shown), which enables the engines and the units to communicate with each other, the user, and other devices over one or more communication networks following certain communication protocols, such as TCP/IP, http, https, ftp, and sftp protocols. Here, the communication networks can be but are not limited to, internet, intranet, wide area network (WAN), local area network (LAN), wireless network, Bluetooth, WiFi, and mobile communication network. The physical connections of the network and the communication protocols are well known to those of skilled in the art.

In the example of FIG. 1, the data collection engine 102 is configured to timely and continuously collect data on current and/or potential cyber attacks from multiple data sources or pools over operational networks, systems, and/or products for just-in-time or real time data correlation and CSTI calculation. Here, the data collection engine 102 is configured to collect the data from the data pools by one or more of streaming, pushing or pulling raw data in its original format, data normalized with respect to other data sources, and/or full-text-searchable indexes of data. In some embodiments, the data collection engine 102 is configured to collect such data in the current networking environment (e.g., networks, systems, and/or products) of a user. In some embodiments, the data collection engine 102 is configured to optimize the collected data into consume-ready form in order to reduce processing time for data correlation.

In some embodiments, at least one pool of data being collected by the data collection engine 102 is actual data to be processed for cyber attack risk analysis, wherein such pool of actual data is tangible and operationally available and can be collected through, e.g., network traffic logs and operational telemetry. In some embodiments, the pool of actual data can be aggregated and consolidated by the data collection engine 102 so that the data can be viewed from different perspectives. In some embodiments, the pool of actual data may include one or more threats by file types weaponized for cyber attacks, wherein the files can be the types of, for non-limiting examples, PDFs, Java scripts, Office docs, program executables, etc., and one or more threats by attack surfaces where the cyber attacks are launched, which, for non-limiting examples, can be inbound and outbound emails, inbound and outbound Web traffic, Web-based applications, internal and/or external or physical and/or wireless networks, endpoint devices such as removable storage devices, etc. In some embodiments, the pool of actual data being collected by the data collection engine 102 may further include one or more cost of analytics and detection of the threats of cyber attacks in dollar amounts, cost of analytics and detection of the threats of cyber attacks in terms of compute resources required, and the number of cyber attack incidents that have been analyzed and/or detected.

In some embodiments, the at least one pool of data being collected by the data collection engine 102 may include both data on the risks of cyber attacks and financial/monetary data corresponding to those cyber attacks. In some embodiments, the pool of actual data may include detected attacks from existing scanners like (spam detectors, phishing detectors, account take over detectors, virus-scanners, hacked user password lists). In some embodiments, at least one pool of actual data may include historic emails gathered by looking at existing emails (for example emails stored in users' mailboxes). In some embodiments, the pool of actual data may include real time emails sent/received either internal or external. In some embodiments, at least one pool of actual data may include training results from employee trainings software (for example cyber-attack training). In some embodiments, the pool of actual data may include past and real-time info about invoices and wire transfers made (for example taken from the company's ERP system or Bank accounts). In some embodiments, at least one pool of actual data may include employee directories which includes job title (e.g. CEO/CFO, department data and other info describing the employee position and exposure). In some embodiments, at least one pool of actual data may include company financial profile (stock market, revenue data, industry, media/PR exposure). In some embodiments, at least one pool of actual data may include sources like log files, file detections, firewall rule alerts and others.

In some embodiments, the at least one pool of data being collected by the data collection engine 102 is influential data, which influences the weights (or multiplication factors) on various kinds the actual data being collected for cyber attack risk analysis. For non-limiting examples, such pool of influential data includes one or more of geographical locations of the actual data being collected, the context (political or environmental) of the actual data being collected, and the current trend of the actual data being collected. In some embodiments, the pool of influential data may further include the context of the user for whom the cyber attack risk analysis is being performed, wherein such context includes but is not limited to the computer system and/or network configurations (e.g., IP addresses, internal and/or external or physical and/or wireless networks, endpoint devices, etc.) and/or other demographic information of the user. In some embodiments, the data collection engine 102 is configured to derive such pool of influential data from one or more of social media, news media and geopolitical-related events associated with the user. In some embodiments, the data collection engine 102 is configured to automatically or manually intervene to adjust or overwrite the influential data.

In the example of FIG. 1, the data correlation engine 104 is configured to synchronize and correlate the data collected from different data pools once such data is readily available to ensure that there is fidelity among the data from the various data pools. In some embodiments, the data correlation engine 104 is configured to realign the actual data point in one data pool with the corresponding influential data point in another data pool so that the actual data point can be weighed appropriately during cyber attack risk analysis. In some embodiments, once the data from different data pools has been correlated, the data correlation engine 104 is further configured to cleanse the collected data of information (e.g., metadata) that is unrelated to cyber attack risk analysis and prepare the data to be used for CSTI calculation. In some embodiments, the data correlation engine 104 is configured to store and maintain the correlated data in data storage unit 110, wherein the correlated data stored in the data storage unit 110 can be retrieved by the index calculation engine 106 and/or the user via the user interaction engine 108 upon requests.

In the example of FIG. 1, the index calculation engine 106 is configured to calculate/derive a single composite cyber security threat index (CSTI) based on the correlated and cleansed actual data on cyber attack risks and its corresponding influence factors. As discussed above, the CSTI not only provides the user with an indication of the current risk of a cyber attack, it may also predict or forecast an elevated level of threat of a cyber attack that may happen in the near future. In some embodiments, the index calculation engine 106 is configured to calculate the CSTI by utilizing a mathematical or statistical predicative model on a uniform scale, wherein the predicative model can be defined, customized and/or implemented specific to the context of computer systems and networks of each user and/or its use case. In some embodiments, the predicative model may have multiple dimensions, which, for non-limiting examples, include geographic locations of the data, application or file types of the cyber attack, surfaces of the cyber attack, and/or demographics of the user. In a variety of use cases, the index calculation engine 106 is configured to customize implementation of the predicative model for a specific user application, which utilizes the CSTI for automated responses to a current or future cyber attack that maps to a granularity of the scale of such attack.

In some embodiments, the index calculation engine 106 is configured to calculate the CSTI as a product of a maximum value of a scale and a sum of all scores based on the actual data (e.g., various file types and attack surfaces) with coefficient of influenced weights (e.g. x, y, factions of 100%), divided by total artifacts (file types, numbers, and/or surfaces) observed and examined within a time window as shown by an example of a formula of the predicative model below:

$$\frac{\sum \left( \begin{array}{l} \text{Weight}(X) \times \text{EmailInboundMaliciousPDFs} + \\ \text{Weight}(Y) \times \text{WebInboundMaliciousMSDocs} \dots \end{array} \right)}{\text{TotalNumberOfArtifacts}} \times$$

$$\text{MaxValueOfScale}$$

In the example above, X and Y are the statistical-based historical/actual data (e.g., PDF file types and MS Word docs launched from inbound emails and inbound Web traffic, respectively) of cyber attacks and Weight(X) and Weight(Y) are the corresponding influential coefficient based on their influential data. The total number of artifacts is a count of all the files launched from all attack surfaces/vectors. The scale of the CSTI can be, for non-limiting examples, a binary scale (0=good, 1=bad) or a 1-9 scale (1-3=good, 4-6=warning, 7-9=bad).

Once the CSTI is calculated, it can be utilized to classify a current of future threat and to automatically launch a specific application by the user as a response to the current of future threat, wherein the classification and response correspond to the CSTI on the scale, e.g., per increments of 1. Here, some applications based on the CSTI are actions and remediation steps, which would help to stop a current attack or warn on potential attacks. For a non-limiting example, in the example of the 1-9 scale discussed above, when the CSTI hits the "bad" range, an integrated firewall or control plane for security products can instrument much stronger security policies in various data-path contact points or configuration settings in the user's current environment to block/counter a current attack or to prevent a future attack.

In the example of FIG. 1, the user interaction engine 108 is configured to present the CSTI to the user along with one or more suggested applications by the user in response to the CSTI automatically (e.g., when the CSTI is in the bad range) or upon receiving a request/instruction from the user. In some embodiments, the user interaction engine 108 is configured to accept an inquiry from the user for additional information or details on the risk of current or future cyber attacks around the globe or specific to the user and interactively present such information to the user accordingly via interacting with other components of the system 100. In some embodiment, the user interaction engine 108 runs on a voice-activated device (e.g., Amazon's Echo devices or Google's Home), wherein the user interaction engine 108 is configured to recognize, accept, and execute a verbal instruction from the user and perform operations corresponding to the verbal instruction accordingly.

Figure 2:
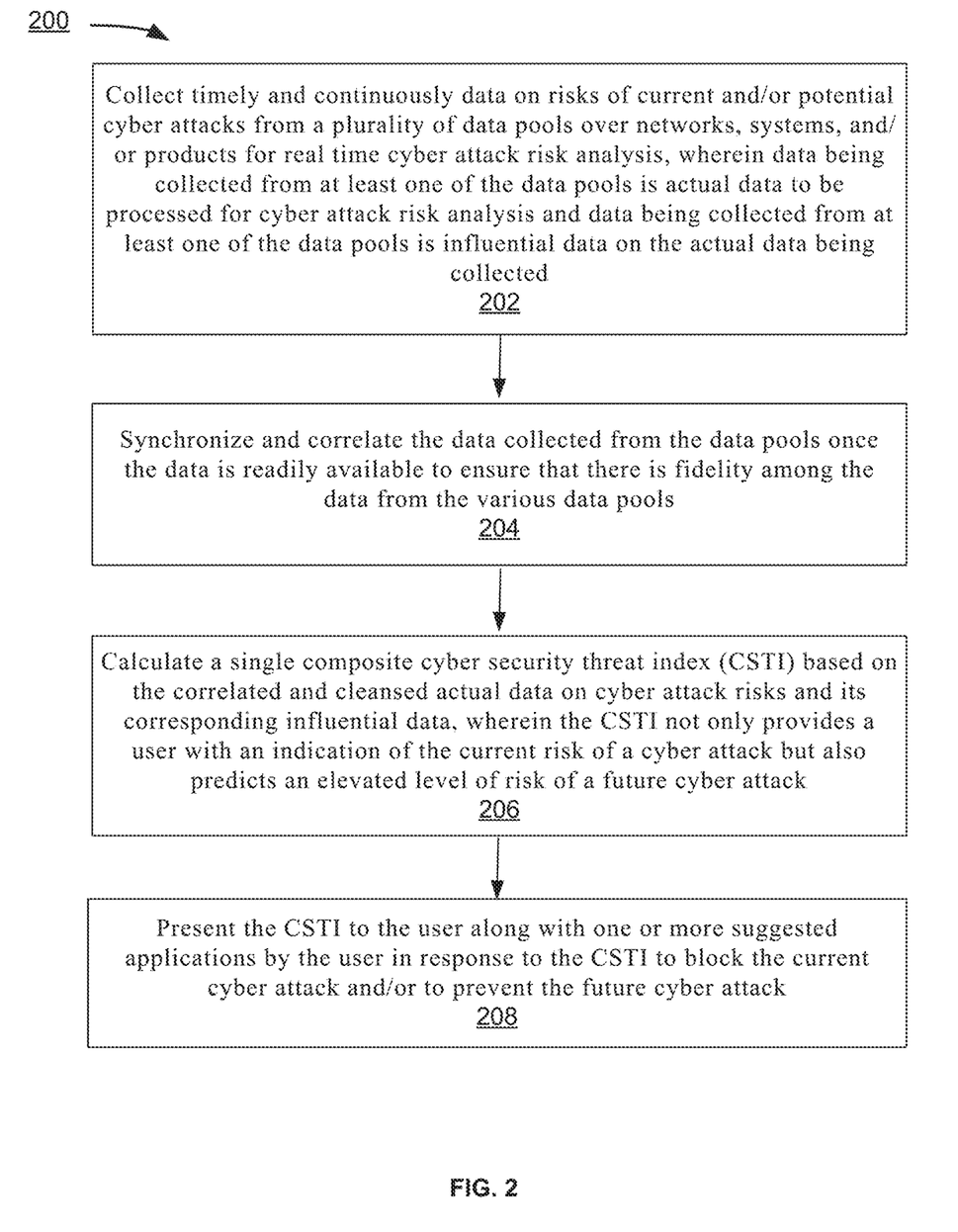
FIG. 2 depicts a flowchart of an example of a process to support generating a single composite CSTI in accordance with some embodiments.

FIG. 2 depicts a flowchart 200 of an example of a process to support generating a single composite Cyber Security Threat Index (CSTI). Although the figure depicts functional steps in a particular order for purposes of illustration, the processes are not limited to any particular order or arrangement of steps. One skilled in the relevant art will appreciate that the various steps portrayed in this figure could be omitted, rearranged, combined and/or adapted in various ways.

In the example of FIG. 2, the flowchart 200 starts at block 202, where data on risks of current and/or potential cyber attacks are timely and continuously collected from a plurality of data pools over networks, systems, and/or products for real time cyber attack risk analysis, wherein data being collected from at least one of the data pools is actual data to be processed for cyber attack risk analysis and data being collected from at least one of the data pools is influential data on the actual data being collected. The flowchart 200 continues to block 204, where the data collected from the data pools are synchronized and correlated once the data is readily available to ensure that there is fidelity among the data from the various data pools. The flowchart 200 continues to block 206, where a single composite cyber security threat index (CSTI) is calculated based on the correlated and cleansed actual data on cyber attack risks and its corresponding influential data, wherein the CSTI not only provides a user with an indication of the current risk of a cyber attack, but also predicts an elevated level of risk of a future cyber attack. The flowchart 200 ends at block 208, where the CSTI is presented to the user along with one or more suggested applications by the user in response to the CSTI to block the current cyber attack and/or to prevent the future cyber attack.

Figure 3A:
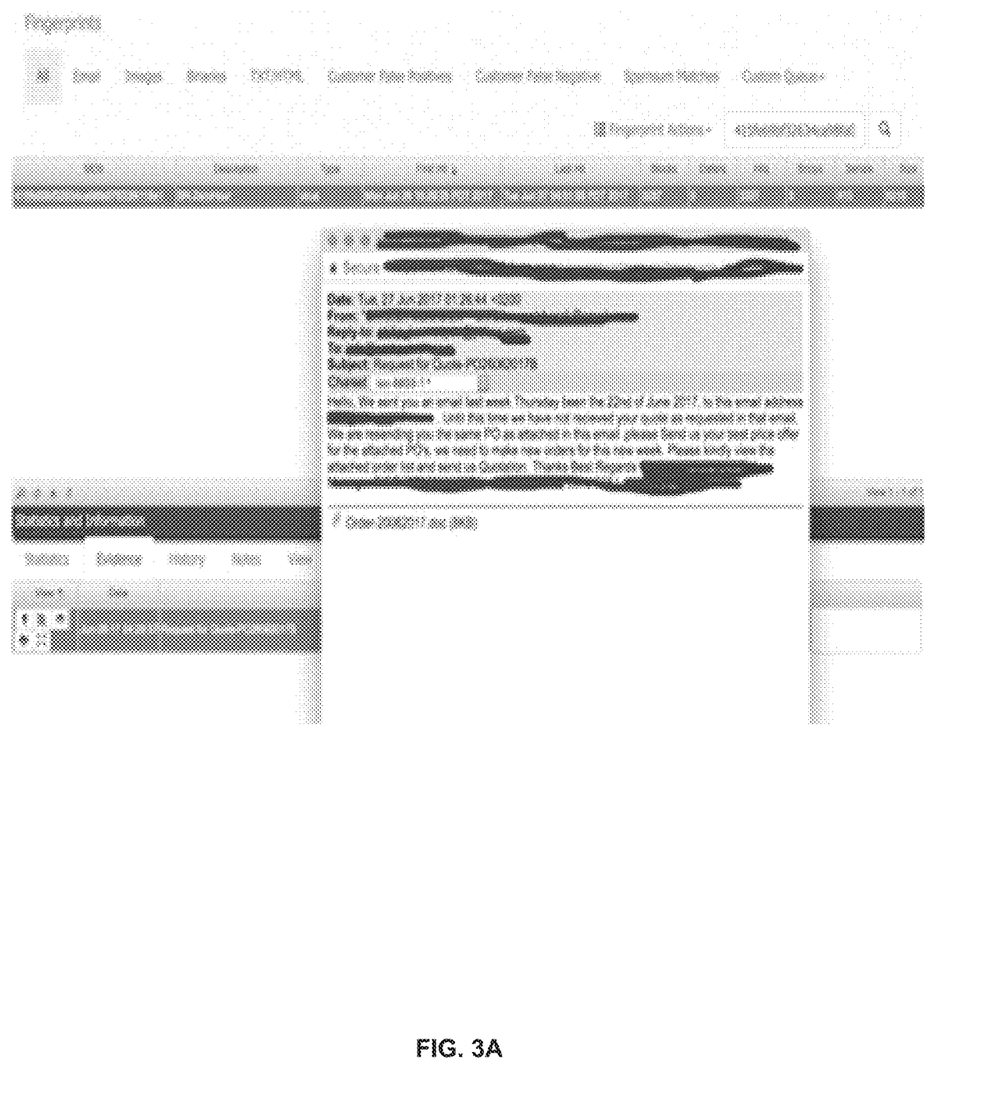
FIG. 3A depicts an example of a NotPetya-type ransomware.

The following is a non-limiting example of a use case on how the CSTI calculated based on collected data on risks of a potential cyber attack can be predictive and be used to get ahead of the actual attack before it happens. NotPetya, or Netya, was a malware spread through malicious email attachments in RTF format and compromised MEDocs software as shown by the example in FIG. 3A. It appeared to be a Petya-type ransomware when the first attack was reported on Jun. 27, 2017. Throughout the next few hours, however, it became clear to the security industry that the attack was a new one that had never been seen before, unlike the version of Petya that had been observed in 2016.

A cyber security system called Barracuda Real Time System (BRTS) like the system 100 described above is constantly engaged with tens of thousands of customer environments and it is able to respond to malicious email attacks in seconds. BRTS identified the first sample of NotPetya ransomware on Jun. 26, 2017, at 4:30 pm PST. BRTS then detected and blocked over 3000 copies of this malicious email from multiple source IP addresses, and the impact was seen in over 400 customers of Barracuda's Email Security Gateway product.

Figure 3B:
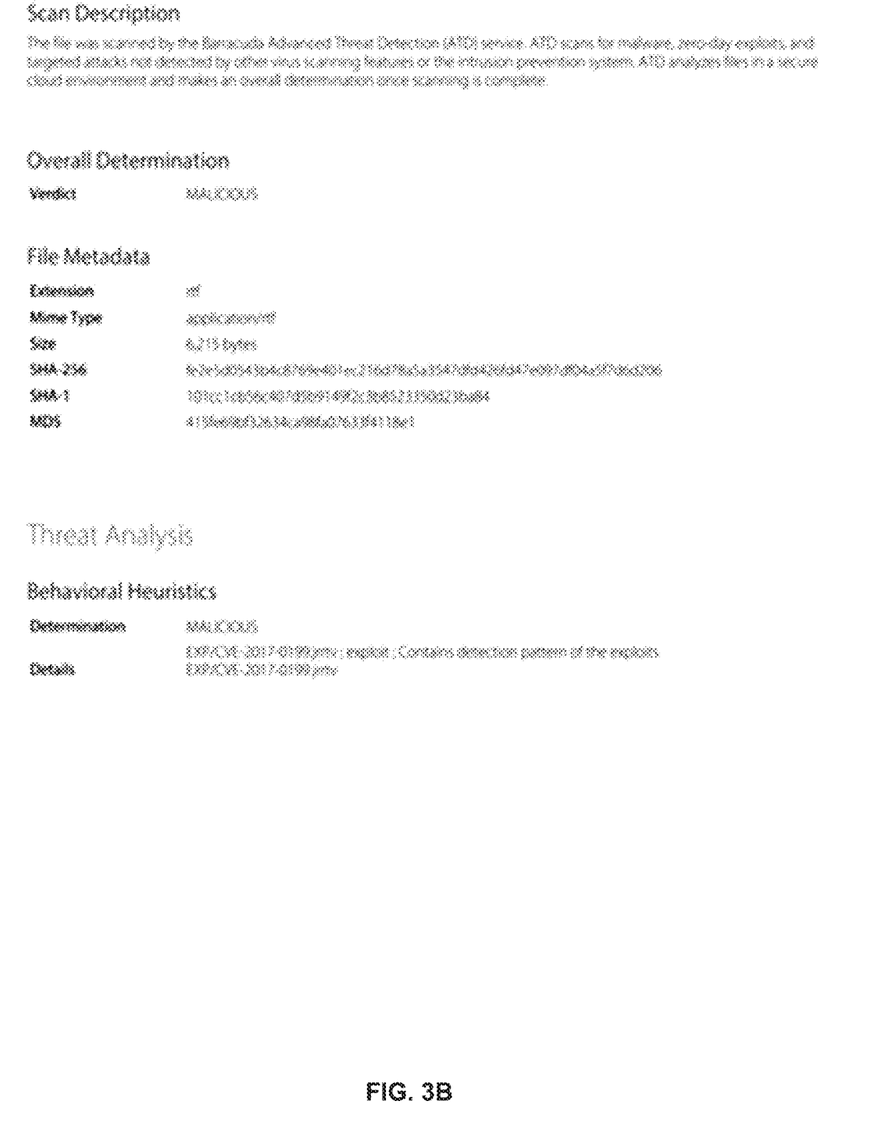
FIG. 3B depicts an example of a screenshot of cyber attack risk analysis report for the attached RTF file type of NotPetya.

While BRTS was stopping the spread of this email attack in the early hours, it was also actively analyzing the cyber attack from the collected samples. FIG. 3B depicts an example of a screenshot of cyber attack risk analysis report for the attached RTF file type of NotPetya. FIG. 3C depicts an example of a screenshot of an analysis of what the RTF file type tries to do when an attachment to the NotPetya-type ransomware was downloaded. During the analysis, BRTS identified several Indicators of Compromise (IoC) of this attack and the following artifacts in this attack were observed:

File Name Order-20062017.doc (RTF with CVE-2017-0199), hash Identifier 415FE69BF32634CA98FA07633F4118E1

Filewith]SHA256hash: 027cc450ef5f8c5f653329641ec1fed91f694e0d229928963b30f6b0d7d3a745

FilewithSHA256hash: 17dacedb6f0379a65160d73c0ae3aa1f03465ae75cb6ae754c7dcb3017af1fbd Note that an email threat vector (Peta.A) of the attack was first observed by BRTS beginning on Jun. 26, 2017, one day before the actual attack so users of BRTS got advanced warning, e.g., an index of elevated warning of an imminent attack. By the time the first NotPetya attack was reported on Jun. 27, 2017, BRTS had been able to block the attack from reaching its user/customers. In the meantime, BRTS were collecting more intelligence on the samples collected from the attack and matching samples, hashes, and IoC to multiple external references while continuously updating the index to the users. The intelligence and analysis was then fed back into the system to protect its users all over the world.

A new approach is proposed hereinafter that contemplates systems and methods to support generating and presenting cyber attack monetary impact estimation to a user, wherein the estimation includes one or more of monetary amount of cyber attacks, frequency and the chance of successful payouts to the attacker. Such estimation involves data in a company's internal and external emails, ERP, and other company systems. By analyzing historic data and real time data, past attacks can be included into the estimation to provide a better picture of cyber attack risks to the company. In some embodiments, the estimation of monetary impact of cyber attacks is not limited to companies. It can be calculated for individual employees too.

Figure 4:
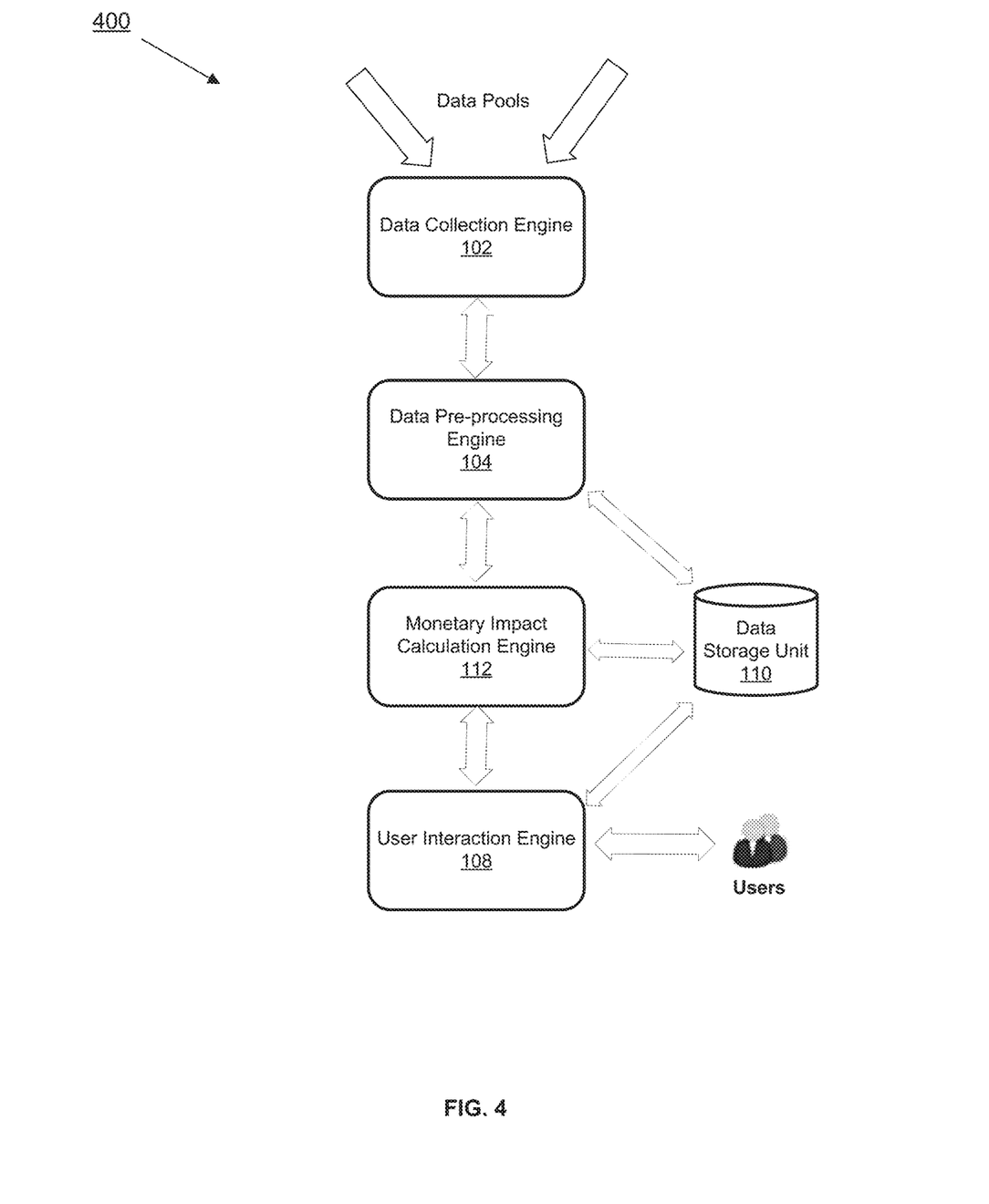
FIG. 4 depicts an example of a system diagram to support cyber attack monetary impact estimation in accordance with some embodiments.

FIG. 4 depicts an example of a system diagram 400 to support generating cyber attack monetary impact estimation. In the example of FIG. 4, the data collection engine 102, the data correlation engine 104, the a user interaction engine 108, and the data storage unit 110 function in substantially similar fashion to those depicted in FIG. 1 discussed above, wherein the index calculation engine 106 in FIG. 1 is replaced with the monetary impact calculation engine 112.

In the example of FIG. 4, the data collection engine 102 is configured to continuously collect data on monetary impact of current and/or potential cyber attacks from a plurality of data pools over computer networks, computer systems, and/or products. In some embodiments, both historic data and real time data are being collected. In some embodiments, data being collected from at least one of the data pools is monetary data. In some embodiments, data being collected from at least one of the data pools is cyber attack risk data. In the example of FIG. 4, the data correlation engine 104 is configured to synchronize and correlate the data being collected from the data pools once the data is available, wherein the synchronization and correlation of the collected data from the data pools creates fidelity among the data from the plurality of data pools. In some embodiments, the data correlation engine 104 is configured to further cleanse the collected data after the synchronization and correlation of the collected data.

In the example of FIG. 4, the monetary impact calculation engine 112 is configured to calculate/derive cyber attack monetary impact estimation based on the correlated and cleansed data on cyber attack risks and its corresponding financial/monetary losses. Here, the cyber attack monetary impact provides a user with an indication of the monetary impact of a current or future cyber attack. In some embodiments, the monetary impact calculation engine 112 is configured to conduct calculation based on both historic data and real data, and based on both cyber attack risks data and corresponding financial/monetary data. In some embodiments, the monetary impact calculation engine 112 is configured to calculate the cyber attack monetary impact by utilizing a mathematical or statistical predicative model on a uniform scale, wherein the predicative model can be defined, customized and/or implemented specific to the context of computer systems and networks of each user and/or its use case. In some embodiments, the predicative model may have multiple dimensions, which, for non-limiting examples, include monetary size of a current or future cyber attack, frequency of a current or future cyber attack, and the success rate of a current or future cyber attack. In some embodiments, monetary impact calculation engine 112 is configured to customize implementation of the predicative model for a specific user application, which utilizes the cyber attack monetary impact for automated responses to a current or future cyber attack that maps to a granularity of the scale of such attack.

In some embodiments, the monetary impact calculation engine 112 is configured to calculate transaction size, such as amounts of typical transactions handled by a company. In some further embodiments, the calculation of transaction size includes scanning emails sent to/from vendors and customers to extract transaction amounts. In yet some other embodiments, the calculation of transaction size includes accessing information from ERP or Bank systems like invoices and wire transfers.

In some embodiments, the monetary impact calculation engine 112 is configured to calculate employee risk including list of at-risk employees. For example, if an employee interacts with invoices/wire transfers or their name is exposed on company publications, he may be at risk. In some further embodiments, the calculation of employee risk includes using employee directories to determine finance related exposure based on job title or department. In some other embodiments, the calculation of employee risk includes scanning employee communication like emails to detect involvement in invoices, wire-transfers and other financial related exposure. In yet some other embodiments, the calculation of employee risk includes analyzing past employee training against cyber security threats.

In some embodiments, the monetary impact calculation engine 112 is configured to calculate communication patterns, such as model of communication patterns between employees, vendors and customers, to decide who is typically involved in financials transactions. For example, an email asking for a wire transfer from the CFO to the accounting department might be a typical case, while an email coming from a support employee asking the same is not.

In some embodiments, the monetary impact calculation engine 112 is configured to calculate hackability factor, such as the probability that employee mailboxes and other computer accounts are compromised. In some further embodiments, the calculation of hackability factor includes scanning for current and past employee account compromises. In some other embodiments, the calculation of hackability factor includes analyzing current and past cyber-attacks (by email or other means) on a company. In yet another embodiments, the calculation of hackability factor includes analyzing the company infrastructure security regarding password policies, MFA protection, availability of intrusion alerting software.

In some embodiments, the monetary impact calculation engine 112 is configured to calculate exposure factor. For example, some companies are more exposed to cyber-attacks than other because of their industry, size or media exposure. In some further embodiments, the calculation of exposure factor includes analyzing company attributes like industry, size, public stock availability and price. In some other embodiments, the calculation of exposure factor includes scanning media exposure in magazines, newspapers and online articles. In yet some other embodiments, the calculation of exposure factor includes computing the number of attacks detected compared to other companies with similar attributes. In some further embodiments, the calculation of exposure factor includes analyzing global state of cyber-attacks at the current moment (e.g. Global Threat Index).

In some embodiments, the monetary impact calculation engine 112 is configured to calculate attack frequency. In some further embodiments, the calculation of attack frequency includes using the exposure factor, attack scanners and reports from employees to build a model to determine the frequency of monetary cyber-attacks. In some embodiments, the monetary impact calculation engine 112 is configured to calculate attack success rate. In some further embodiments, the calculation of attack success rate is conducted based on the hackability factor, attack frequency, and information like employee risk and security training.

In some embodiments, the monetary impact calculation engine 112 is configured to use mathematical models and/or machine learning to generate cyber attack monetary impact estimation per employee and/or company based on the computed features disclosed above. In some embodiments, the cyber attack monetary impact estimation includes calculating monetary size (amount) of a current or future cyber-attack. In some other embodiments, the cyber attack monetary impact estimation includes computing frequency of a current or future cyber-attack involving monetary transactions. In some other embodiments, the cyber attack monetary impact estimation includes calculating success rate of a current or future cyber-attack with request for monetary transactions. In some embodiments, the monetary impact calculation engine 112 is configured to calculate the cyber attack monetary impact for one person, for an entity with a plurality of persons, or for a plurality of entities.

In the example of FIG. 4, the user interaction engine 108 is configured to present the cyber attack monetary impact to the user along with one or more suggested applications by the user in response to the cyber attack monetary impact to mitigate the monetary impact of the current or future cyber attack. According to some embodiments, the cyber attack monetary impact is used to compute cyber insurance premiums for a company. In some further embodiments, the cyber attack monetary impact is used to find new leads or up-selling potential for cyber security software and hardware products. In one illustrative embodiment, the cyber attack monetary impact is used to generate reports about impacts of cyber security attacks within the company (personalized).

In some cases, one or more of the applications based on the cyber attack monetary impact are actions and remediation steps, which would help to stop monetary losses or to mitigate monetary impacts of a current or future attack. In some other embodiments, the user interaction engine 108 is configured to accept an inquiry from the user for additional information or details on the cyber attack monetary impact around the globe or specific to the user and interactively present such information to the user accordingly. In some further embodiments, the user interaction engine 108 runs on a voice-activated device and is configured to recognize, accept, and execute a verbal instruction from the user and perform operations corresponding to the verbal instruction accordingly.

Figure 5:
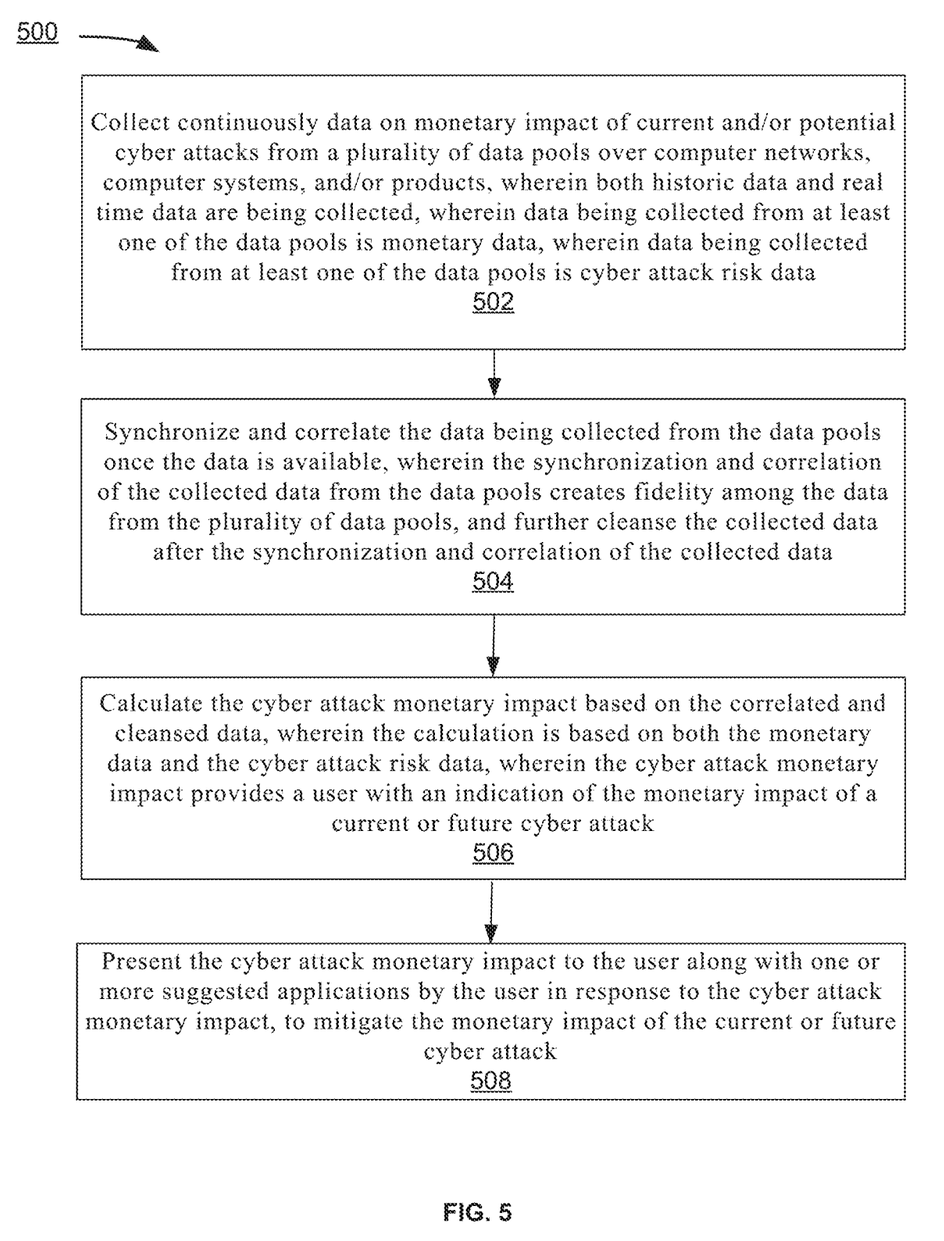
FIG. 5 depicts a flowchart of an example of a process to support generating cyber attack monetary impact estimation with some embodiments.

FIG. 5 depicts a flowchart 500 of an example of a process to support generating cyber attack monetary impact estimation. Although the figure depicts functional steps in a particular order for purposes of illustration, the processes are not limited to any particular order or arrangement of steps. One skilled in the relevant art will appreciate that the various steps portrayed in this figure could be omitted, rearranged, combined and/or adapted in various ways.

In the example of FIG. 5, the flowchart 500 starts at block 502, wherein data on monetary impact of current and/or potential cyber attacks is continuously collected from a plurality of data pools over computer networks, computer systems, and/or products, wherein both historic data and real time data are being collected, wherein data being collected from at least one of the data pools is monetary data, wherein data being collected from at least one of the data pools is cyber attack risk data. The flowchart 500 continues to block 504, wherein the data being collected from the data pools is synchronized and correlated once the data is available, wherein the synchronization and correlation of the collected data from the data pools creates fidelity among the data from the plurality of data pools. The collected data is further cleansed after the synchronization and correlation of the collected data. The flowchart 500 continues to block 506, wherein the cyber attack monetary impact is calculated based on the correlated and cleansed data, wherein the calculation is based on both the monetary data and the cyber attack risk data, wherein the cyber attack monetary impact provides a user with an indication of the monetary impact of a current or future cyber attack. The flowchart 500 continues to block 508, wherein the cyber attack monetary impact is presented to the user along with one or more suggested applications by the user in response to the cyber attack monetary impact, to mitigate the monetary impact of the current or future cyber attack.

One embodiment may be implemented using a conventional general purpose or a specialized digital computer or microprocessor(s) programmed according to the teachings of the present disclosure, as will be apparent to those skilled in the computer art. Appropriate software coding can readily be prepared by skilled programmers based on the teachings of the present disclosure, as will be apparent to those skilled in the software art. The invention may also be implemented by the preparation of integrated circuits or by interconnecting an appropriate network of conventional component circuits, as will be readily apparent to those skilled in the art.

The methods and system described herein may be at least partially embodied in the form of computer-implemented processes and apparatus for practicing those processes. The disclosed methods may also be at least partially embodied in the form of tangible, non-transitory machine readable storage media encoded with computer program code. The media may include, for example, RAMs, ROMs, CD-ROMs, DVD-ROMs, BD-ROMs, hard disk drives, flash memories, or any other non-transitory machine-readable storage medium, wherein, when the computer program code is loaded into and executed by a computer, the computer becomes an apparatus for practicing the method. The methods may also be at least partially embodied in the form of a computer into which computer program code is loaded and/or executed, such that, the computer becomes a special purpose computer for practicing the methods. When implemented on a general-purpose processor, the computer program code segments configure the processor to create specific logic circuits. The methods may alternatively be at least partially embodied in a digital signal processor formed of application specific integrated circuits for performing the methods.

What is claimed is:

1. A system to support cyber attack monetary impact estimation, comprising:

a data collection engine running on a host and configured to continuously collect data on monetary impact of current and/or potential cyber attacks from a plurality of data pools over computer networks, computer systems, and/or products, wherein both historic data and real time data are being collected, wherein data being collected from at least one of the data pools is monetary data, wherein data being collected from at least one of the data pools is cyber attack risk data;

a data correlation engine running on a host and configured to synchronize and correlate the data being collected from the data pools once the data is available, wherein the synchronization and correlation of the collected data from the data pools creates fidelity among the data from the plurality of data pools, wherein the data correlation engine is configured to further cleanse the collected data after the synchronization and correlation of the collected data;

a monetary impact calculation engine running on a host and configured to calculate the cyber attack monetary impact based on the correlated and cleansed data, wherein the calculation is based on both the monetary data and the cyber attack risk data, wherein the cyber attack monetary impact provides a user with an indication of the monetary impact of a current or future cyber attack;

a user interaction engine running on a host and configured to present the cyber attack monetary impact to the user along with one or more suggested applications by the user in response to the cyber attack monetary impact, to mitigate the monetary impact of the current or future cyber attack.

2. The system of claim 1, wherein:
the cyber attack monetary impact is calculated for one person, for an entity with a plurality of persons, or for a plurality of entities.

3. The system of claim 1, wherein:
the cyber attack monetary impact comprises monetary size of the current or future cyber attack, frequency of the current or future cyber attack, and success rate of the current or future cyber attack.

4. The system of claim 1, wherein:
the cyber attack risk data comprises internal and external securities scores that reflect the global risk of cyber attacks.

5. The system of claim 1, wherein:
the cyber attack risk data is in a customized form in context of current computing and network environment of the user to reflect the risk of cyber attacks that specifically target the user.

6. The system of claim 1, wherein:
the user is one of a person or human being, an organization, a group of organizations, a country, and a continent that may be subject to monetary loss of a cyber attack.

7. The system of claim 1, wherein:
the data collection engine is configured to collect the data from the data pools by one or more of streaming, pushing or pulling raw data in its original format, data normalized with respect to other data pools, and/or full-text-searchable indexes of data.

8. The system of claim 1, wherein:
the data collection engine is configured to optimize the collected data into consume-ready form in order to reduce processing time for data correlation.

9. The system of claim 1, wherein:
the data collection engine is configured to collect the data through network traffic logs and operational telemetry.

10. The system of claim 1, wherein:
the data collection engine is configured to aggregate and consolidate the pool of data so that the data can be viewed from different perspectives.

11. The system of claim 1, wherein:
one or more of the applications based on the cyber attack monetary impact are actions and remediation steps, which would help to stop monetary losses or to mitigate monetary impacts of a current or future attack.

12. The system of claim 1, wherein:
the user interaction engine is configured to accept an inquiry from the user for additional information or details on the cyber attack monetary impact around the globe or specific to the user and interactively present such information to the user accordingly.

13. The system of claim 1, wherein:
the user interaction engine runs on a voice-activated device and is configured to recognize, accept, and execute a verbal instruction from the user and perform operations corresponding to the verbal instruction accordingly.

14. A computer-implemented method to support cyber attack monetary impact estimation, comprising:
continuously collecting data on monetary impact of current and/or potential cyber attacks from a plurality of data pools over computer networks, computer systems, and/or products, wherein both historic data and real time data are being collected, wherein data being collected from at least one of the data pools is monetary data, wherein data being collected from at least one of the data pools is cyber attack risk data;
synchronizing and correlating the data being collected from the data pools once the data is available, wherein the synchronization and correlation of the collected data from the data pools creates fidelity among the data from the plurality of data pools, and further cleansing the collected data after the synchronization and correlation of the collected data;
calculating the cyber attack monetary impact based on the correlated and the cleansed data, wherein the calculation is based on both the monetary data and the cyber attack risk data, wherein the cyber attack monetary impact provides a user with an indication of the monetary impact of a current or future cyber attack;
presenting the cyber attack monetary impact to the user along with one or more suggested applications by the user in response to the cyber attack monetary impact, to mitigate the monetary impact of the current or future cyber attack.

15. The computer-implemented method of claim 14, further comprising:
collecting the data from the data pools by one or more of streaming, pushing or pulling raw data in its original format, data normalized with respect to other data pools, and/or full-text-searchable indexes of data.

16. The computer-implemented method of claim 14, further comprising:
optimizing the collected data into consume-ready form in order to reduce processing time for data correlation.

17. The computer-implemented method of claim 14, further comprising:
collecting the data through network traffic logs and operational telemetry.

18. The computer-implemented method of claim 14, further comprising:
aggregating and consolidating the pool of actual data so that the data can be viewed from different perspectives.

19. The computer-implemented method of claim 14, further comprising:
accepting an inquiry from the user for additional information or details on the cyber attack monetary impact around the globe or specific to the user and interactively present such information to the user accordingly.

20. The computer-implemented method of claim 14, further comprising:
recognizing, accepting, and executing a verbal instruction from the user and perform operations corresponding to the verbal instruction accordingly via a voice-activated device.

* * * * *